J. V. ROBINSON.
AUTOMATIC TRAIN PIPE CONNECTOR.
APPLICATION FILED JUNE 10, 1912. RENEWED SEPT. 13, 1917.
1,245,776.
Patented Nov. 6, 1917.
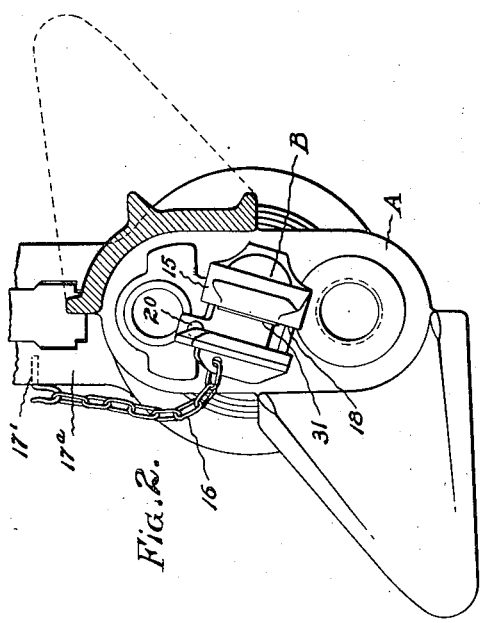
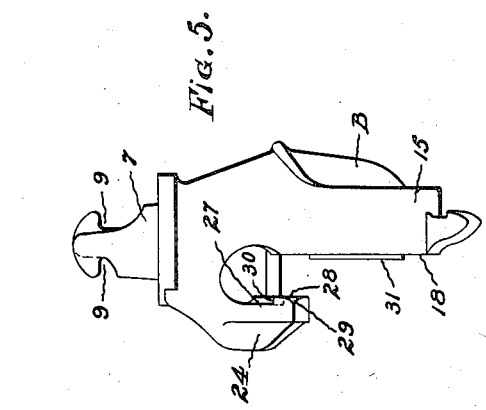
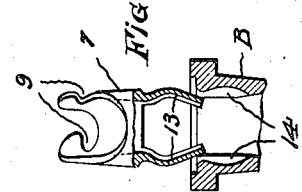
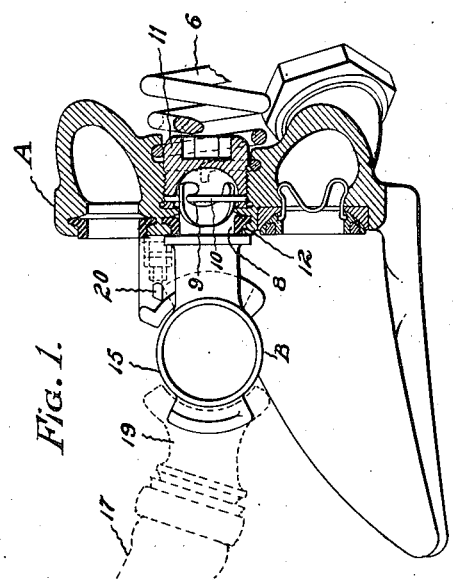
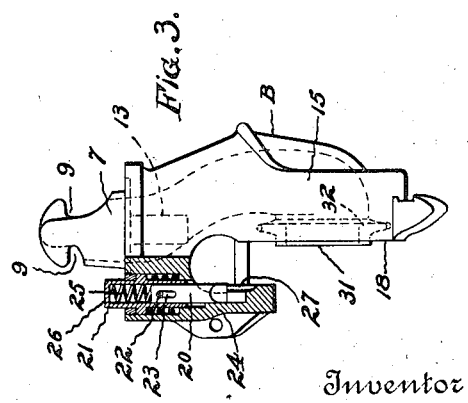
Inventor
Joseph V. Robinson
By J. A. Watson
Attorney
Witnesses

UNITED STATES PATENT OFFICE.

JOSEPH V. ROBINSON, OF BRANFORD, CONNECTICUT.

AUTOMATIC TRAIN-PIPE CONNECTOR.

1,245,776.  Specification of Letters Patent.  Patented Nov. 6, 1917.

Application filed June 10, 1912, Serial No. 702,817. Renewed September 13, 1917. Serial No. 191,304.

*To all whom it may concern:*

Be it known that I, JOSEPH V. ROBINSON, a citizen of the United States, and resident of Branford, county of New Haven, State of Connecticut, have invented certain new and useful Improvements in Automatic Train-Pipe Connectors, of which the following is a specification.

This invention relates to automatic train pipe connectors for railway cars and has for its object to provide an improved interchange device for connecting a car equipped with an automatic train pipe connector with one not so equipped. The interchange comprising my invention is simple and effective and constructed to automatically disengage from the connector head and hose in event cars in interchange connection are parted without first disconnecting the hose of the unequipped car from the interchange device.

In carrying out my invention I employ the torsional tension of the hose of the unequipped car to lock the interchange member in the service position, and in one embodiment of the invention I utilize the air pressure in the train pipe to positively lock the improved interchange to the hose of the unequipped car.

With these objects in view my invention consists in the combinations, arrangements and constructions hereinafter described, pointed out in the appended claims and illustrated in the accompanying drawings, in which:

Figure 1, is a side elevation of my improved interchange applied to a connector head.

Fig. 2, is an end view of Fig. 1.

Fig. 3, is a sectional plan view of the interchange device.

Fig. 4, is a detail view, and

Fig. 5, is a view showing a modification of the lock for the interchange.

Any satisfactory form of connector head A may be used with my improved interchange device B, and any of the well-known types of support for suspending the connector head from the car may be employed. Such a support I indicate at 6.

I provide the interchange B with a detachable sleeve 7 adapted to enter the port or aperture 8 of the connector head. The sleeve is provided with bayonet slots 9 for engaging a pin or projection 10 carried by the nut or plug 11, or otherwise secured within said port; said bayonet slots being preferably slightly rounded for forcing said interchange member with a clamping action tightly against the connector head gasket 12. Resilient fingers 13 integral with the sleeve 7 fit in complementary ways 14 of the interchange and firmly secure the sleeve to the latter. Under abnormal pull, such as occurs in parting cars in interchange without first disconnecting the hose, the resilient fingers 13 yield, permitting automatic disconnection of the interchange head 15 from the connector head A. Upon such automatic uncoupling of the interchange head from the connector head, it is caught by the chain 16 which, upon continued separation of the cars, will automatically disengage it from the hose 17 of the unequipped car and also insure against loss thereof, as the chain is connected at 17' to the bracket or support 17ª of the connector, as shown.

The interchange head 15 is supported on the connector head A with its coupling face 18 extending at an angle of approximately fifteen degrees to the vertical plane in which the coupling face of the usual hose nipple 19 normally extends, (see especially Fig. 2) but such face 18 may be extended at different angles with respect to said plane.

This angular positioning of the coupling face 18 renders it necessary to twist the train pipe hose 17 in order to bring its nipple into coupled engagement with the interchange head 15, whereby the torsional strain of the twisted hose acts strongly to maintain the bayonet slots 9 in firm interlocking engagement with the pin 10 and insure a tight coupled engagement between the interchange head 15 and the connector head A.

The interchange member is provided with a latch for positively locking the hose nipple 19 in interchange connection therewith. I have shown the latch comprising a bolt 20 slidably confined in a sleeve 21 by a pin 22 and slot 23 in said bolt and sleeve, respectively; said bolt being mounted on the arm 24 of the interchange head and yieldingly maintained in its advanced position by a spring 25. The sleeve 21 is provided with an end portion 26 adapted to engage the connector head A and be thereby advanced, to extend the bolt 20 into the path 27 on the arm 24, when the interchange member is locked in the connector head A in the previously described manner. The springpressed bolt 20 yields to permit ready coupling of the nipple 19 of the train pipe hose 17 and interchange member B, but positively locks said nipple and member in coupled engagement as long as the sleeve 21 is maintained in advanced position by engagement with the connector head, permitting ready disconnection of the nipple and interchange member upon removal of the latter from the connector head.

This constitutes an improved construction, which necessitates removal of the interchange member from the automatic connector before the train pipe hose can be uncoupled; thereby eliminating all danger of the interchange member being carelessly left in position on the connector head after the train pipe hose has been uncoupled therefrom.

Fig. 5 illustrates a modified construction of the lock for securing the interchange head B and nipple 19 together, in which the arm 24 of the interchange head is provided with a boss 28 having a tapered face 29 for facilitating the entrance of the hose nipple 19 into coupled engagement therewith. Said boss terminates in an abrupt shoulder 30 which constitutes a lock for preventing accidental uncoupling of the nipple 19 from the interchange head when subjected to the oscillatory movement to which connector heads are subjected in interchange service. The gasket of the hose nipple and the coöperating gasket 31 of the interchange member will, of course, yield sufficiently to permit ready coupling and uncoupling of said nipple and member when the pressure of the train pipe is cut off; while such train pipe pressure, tending to force the nipple and member apart when coupled by acting on the bases 32 of the gaskets thereof, will greatly augment the locking effect of said boss 28 and positively locks the nipple and member B in coupled engagement under all conditions of service.

Having thus described my said invention, what I claim as new and desire to secure by United States Letters Patent is:

1. In a train pipe connector the combination with a connector head, of means for positively locking the train pipe hose of an adjacent car in a train in interchange connection with said head.

2. In a train pipe connector the combination with a connector head, of an interchange member for maintaining the train pipe hose of an adjacent car in a train positively locked in interchange connection with said head.

3. In a train pipe connector provided with a head, the combination of an interchange member for detachably engaging said head, means for positively locking said member in interchange connection with a train pipe hose, and means for automatically releasing said positive locking means upon detachment of said interchange member from the head.

4. In a train pipe connector provided with a head, the combination of an interchange member for detachably engaging said head, means yieldingly maintained in position for positively locking said member in interchange connection with a train pipe hose, and means for automatically releasing said positive locking means upon detachment of said interchange member from the head.

5. In a train pipe connector provided with a head, the combination of an interchange member for detachably engaging said head, movable means for positively locking said member in interchange connection with a train pipe hose, and means for automatically shifting said movable means to inoperative position upon detachment of said interchange member from the head.

6. In a train pipe connector provided with a head, the combination of an interchange member for detachably engaging said head, movable means, means for yieldingly maintaining said movable means in position for permitting the coupling of a train pipe hose in interchange connection with said member and for positively locking said member and hose in coupled engagement, and means for automatically shifting said movable means to inoperative position upon detachment of said interchange member from the head.

7. In a train pipe connector provided with a head, the combination of an interchange member for detachably engaging said head, means for coupling a train pipe hose in interchange connection with said member, and automatically acting means permitting uncoupling of said member and hose upon detachment of said member from the head.

8. In an automatic train pipe connector, the combination of a coupling head, and an interchange member for coupling a train pipe hose to said head and adapted to be automatically disconnected from said head under abnormal strain such as occurs upon accidental uncoupling of the cars without first uncoupling said train pipe hose from said interchange member.

9. In a train pipe connector provided with a head, the combination of an interchange member for detachably engaging said head, means for coupling the train pipe hose of an adjacent car in a train to said member, and automatically actuated means for permitting disconnection of said interchange member from said head and hose upon separation of the connected cars.

10. In an automatic train pipe connector provided with a head, the combination of an interchange member for coupling a train pipe hose in interchange connection with said head, and coöperating means on said member and head adapted to be maintained in interlocking engagement by the torsional tension of said hose.

11. In an automatic train pipe connector provided with a head, the combination of an interchange member for coupling a train pipe hose in interchange connection with said head, and interlocking means on said head and member for supporting the latter with its coupling face disposed angularly to the coupling face of said hose.

12. In a train pipe connector, the combination with a head, of an interchange member adapted to connect the train pipe hose of an adjacent car not equipped with an automatic connector in interchange connection with a port in said head, and means independent of the head for supporting said member when disengaged from said port.

13. In a train pipe connector, the combination with a suitable head, of an interchange member adapted to connect a port in the head with the train pipe hose of an adjacent car in a train not equipped with an automatic connector, and a permanent connection between the interchange member and the bracket to which the head is attached.

In testimony whereof, I have hereunto set my hand in the presence of two witnesses.

JOSEPH V. ROBINSON.

Witnesses:
CLINTON M. SMITH,
W. E. ROSE.